United States Patent
Lee et al.

(10) Patent No.: US 10,661,489 B2
(45) Date of Patent: May 26, 2020

(54) METHOD OF COATING SURFACE OF INTERIOR COMPONENT FOR VEHICLE

(71) Applicant: Hyundai Motor Company, Seoul (KR)

(72) Inventors: Young-Ju Lee, Suwon-si (KR); Hye-Kyung Kim, Suwon-si (KR); Keon-Soo Jin, Ulsan (KR); Dae-Ig Jung, Suwon-si (KR); Chang-Hyeon Noh, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 349 days.

(21) Appl. No.: 15/343,825

(22) Filed: Nov. 4, 2016

(65) Prior Publication Data

US 2017/0361514 A1    Dec. 21, 2017

(30) Foreign Application Priority Data

Jun. 15, 2016 (KR) .................. 10-2016-0074384

(51) Int. Cl.
| | | |
|---|---|---|
| *B29C 45/14* | (2006.01) | |
| *B29C 45/16* | (2006.01) | |
| *B29C 45/00* | (2006.01) | |
| *B29K 75/00* | (2006.01) | |
| *B29L 31/30* | (2006.01) | |

(52) U.S. Cl.
CPC .... *B29C 45/14819* (2013.01); *B29C 45/0001* (2013.01); *B29C 45/0025* (2013.01); *B29C 45/1671* (2013.01); *B29C 45/162* (2013.01); *B29K 2075/00* (2013.01); *B29K 2995/002* (2013.01); *B29L 2031/30* (2013.01)

(58) Field of Classification Search
None
See application file for complete search history.

(56) References Cited

U.S. PATENT DOCUMENTS

| | | | | |
|---|---|---|---|---|
| 2,298,365 | A * | 10/1942 | Gits | ................. B29C 45/14344 264/247 |
| 4,205,036 | A * | 5/1980 | Trame | ..................... B29C 45/14 264/132 |
| 4,297,313 | A * | 10/1981 | Duckstein | ............ A61J 17/001 264/273 |
| 4,722,818 | A * | 2/1988 | Zoller | .................... B29C 48/30 264/171.14 |
| 4,753,586 | A | 6/1988 | Curtis | |
| 4,797,244 | A * | 1/1989 | Sauer | ..................... B29C 45/14 215/12.2 |
| 5,225,264 | A * | 7/1993 | Kato | ................... A47B 96/206 428/137 |
| 5,389,317 | A | 2/1995 | Grimmer | |
| 5,411,688 | A * | 5/1995 | Morrison | ............ B29C 45/1418 156/245 |

(Continued)

FOREIGN PATENT DOCUMENTS

| | | |
|---|---|---|
| JP | 7-164457 A | 6/1995 |
| JP | 2003-159724 A | 6/2003 |

(Continued)

*Primary Examiner* — Edmund H Lee
(74) *Attorney, Agent, or Firm* — Morgan, Lewis & Bockius LLP

(57) ABSTRACT

A method of coating a surface of an interior component for a vehicle may include coupling a mold cavity on the interior component seated on a core and closing the mold cavity, and coating a surface of the interior component by injecting polyurethane into an interior of the coupled mold cavity and the core.

11 Claims, 9 Drawing Sheets

(56) References Cited

U.S. PATENT DOCUMENTS

| | | | | |
|---|---|---|---|---|
| 5,525,179 | A * | 6/1996 | Stickling | B29C 45/1671 156/245 |
| 5,565,263 | A * | 10/1996 | Ohsumi | B27D 1/00 442/376 |
| 5,938,881 | A * | 8/1999 | Kawata | B29C 43/203 156/307.4 |
| 6,168,742 | B1 * | 1/2001 | Yamamoto | B29C 45/14 264/266 |
| 6,264,869 | B1 * | 7/2001 | Notarpietro | B29C 45/1671 264/247 |
| 6,444,319 | B1 * | 9/2002 | Berg | B05C 3/18 425/135 |
| 6,827,895 | B1 * | 12/2004 | Yamamoto | B29C 45/14 264/266 |
| 6,905,643 | B2 * | 6/2005 | Junker | B29C 45/14065 264/250 |
| 7,087,199 | B2 * | 8/2006 | Delcros | B29C 44/1257 264/46.4 |
| 7,344,669 | B2 * | 3/2008 | Yamamoto | B29C 45/14196 264/247 |
| 7,674,414 | B2 * | 3/2010 | Neitzke | B29C 45/1671 264/241 |
| 7,981,342 | B2 * | 7/2011 | Hayes | B29C 45/1671 264/241 |
| 2002/0031643 | A1 * | 3/2002 | Hardgrove | B29C 45/1418 428/119 |
| 2005/0225006 | A1 * | 10/2005 | Murar | B29C 43/021 264/275 |
| 2006/0198921 | A1 | 9/2006 | Fujita | |
| 2007/0054116 | A1 * | 3/2007 | Neitzke | B29C 44/1238 428/343 |
| 2009/0134549 | A1 * | 5/2009 | Yamamoto | B29C 45/0025 264/261 |

FOREIGN PATENT DOCUMENTS

| | | |
|---|---|---|
| JP | 2005-161683 A | 6/2005 |
| JP | 2010-120312 A | 6/2010 |
| JP | 2012-006222 A | 1/2012 |
| KR | 10-2007-0027484 A | 3/2007 |
| KR | 10-1498552 B1 | 3/2015 |
| WO | WO 2006/072361 A1 | 7/2006 |

* cited by examiner

METHOD OF COATING SURFACE OF INTERIOR COMPONENT FOR VEHICLE

CROSS-REFERENCE TO RELATED APPLICATIONS

The present application claims priority to Korean Patent Application No. 10-2016-0074384, filed Jun. 15, 2016, the entire contents of which is incorporated herein for all purposes by this reference.

BACKGROUND OF THE INVENTION

Field of the Invention

The present invention relates to a method of coating a surface of an interior component for a vehicle, and more particularly, to a coating method which prevents formation of an overmolded portion or a polyurethane burr by injecting polyurethane into a closed mold.

Description of Related Art

Recently, as concerns about environmental pollution have grown to a greater extent worldwide, intensive actions are being conducted in industries in order to reduce environmental pollutants. In particular, great efforts are being made to reduce emission of environmental pollutants in automobile industries by minimizing environmental pollutants in exhaust gas of a vehicle or improving fuel economy of the vehicle. As methods of improving fuel economy of the vehicle, there exist a method of improving efficiency of an engine, and a method of reducing a weight of the vehicle.

Among the methods, there is a method of improving durability and strength of alloy steel applied to the vehicle in automobile industries in order to reduce a weight of the vehicle, but great efforts are being made to manufacture various components applied to the vehicle by using plastic materials that are light in weight and have excellent strength. In particular, among various components for a vehicle, interior components do not require high strength and are not greatly affected by light and temperature, that is, an external environment in comparison with large externally-carried components or components applied to a driving system of the vehicle. Therefore, in most cases, the interior components for a vehicle are made of a plastic material.

However, various chemicals, which are carcinogenic, are used during a process of manufacturing these plastic materials, and carcinogens such as formaldehyde are produced from the component after the component is completely manufactured. In addition, recently, automobile industries have established strategies to improve quality of the interior components for a vehicle in order to meet demands of consumers, and make an effort to solve a problem in that the interior components made of a plastic material cannot provide luxurious quality unlike a real material such as wood.

To solve the aforementioned problem, the related art intends to provide luxurious quality to the interior component for a vehicle by applying a real material to the interior component for a vehicle, and coating a surface of the real material. However, a method of applying a real material to the interior component for a vehicle as described above has a problem in that an overmolded portion is formed because a surface of the real material is coated in an open manner.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a coating method capable of removing an overmolded portion and a polyurethane burr by injecting polyurethane in a state in which a mold cavity and a core are closed.

Additionally, various aspects of the present invention are directed to providing an interior component for a vehicle, which enables an overmolded portion and a polyurethane burr to be removed from the interior component for a vehicle, such that a manufacturing method is simplified and manufacturing time and production costs are reduced.

According to various aspects of the present invention, a method of coating a surface of an interior component for a vehicle may include coupling a mold cavity on the interior component seated on a core and closing the mold cavity, and coating a surface of the interior component by injecting polyurethane into an interior of the coupled mold cavity and the core.

The coupling may include seating a real material on an upper mold, closing, of coupling the core on the upper mold and closing the core, back injection molding, of injecting a base material, by back injection molding, to a surface of the material positioned in the interior closed by the core and the upper mold, and mold removing, of removing the upper mold.

A first overlap portion may be recessed at a first side of the interior component which overlaps the mold cavity.

The first overlap portion may be formed by a first section which is recessed in a direction toward the real material at a height identical to a height of a coating layer of the polyurethane and in which the mold cavity and the real material overlap each other by 0.15 to 0.3 mm, a second section which is extended from the first section and bent in a direction toward the mold cavity and in which the mold cavity and the real material overlap each other by 0.15 to 0.3 mm, and a third section which is extended from the second section and bent in a direction toward the core and in which the mold cavity and the real material overlap each other by 2.0 to 2.5 mm.

A space portion spaced at a predetermined interval and a protruding second overlap portion may be formed at a second side of the interior component which overlaps the mold cavity.

The second overlap portion may be formed by a fourth section which is extended from the core and recessed in a direction toward the mold cavity and overlaps by 0.15 to 0.3 mm, a fifth section which is extended from the fourth section and bent vertically and overlaps 3 to 5 mm, and a sixth section which is extended from the fifth section and bent and extended parallel to a surface of the mold cavity.

The coating may include injecting polyurethane at a pressure of 150 to 200 bar.

A thickness of a coating layer of the polyurethane may be 0.8 to 1.2 mm.

The polyurethane may be black-colored polyurethane.

The base material may have a base material surface to which a pattern is added.

According to various aspects of the present invention, an interior component for a vehicle which is coated by a method of coating a surface of the interior component, in which the method of coating includes coupling a mold cavity on the interior component seated on a core and closing the mold cavity, and coating a surface of the interior component by injecting polyurethane into an interior of the coupled mold cavity and the core.

According to the method of coating a surface of an interior component for a vehicle according to various embodiments of the present invention, it is possible to remove an overmolded portion and a polyurethane burr.

According to the interior component for a vehicle according to various embodiments of the present invention, it is possible to simplify a manufacturing method and reduce manufacturing time and production costs.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
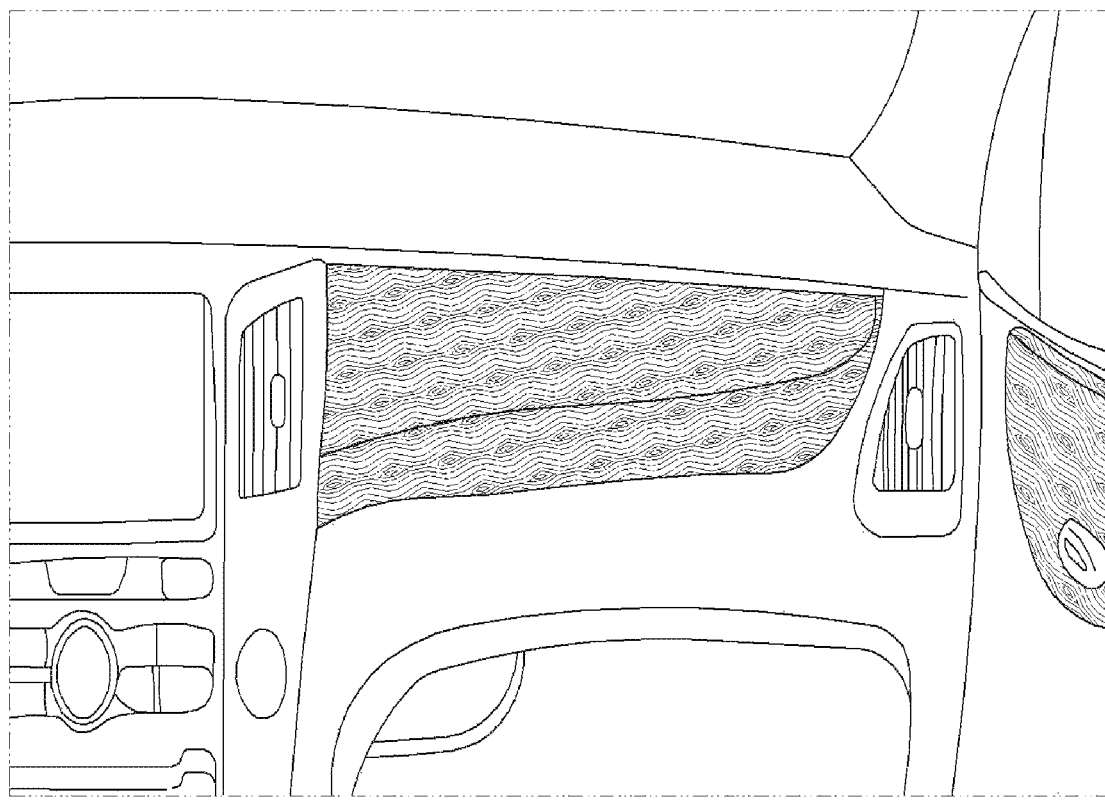
FIG. 1 is an exemplified view illustrating a state in which a component made of a real material and coated with polyurethane in the related art is applied.

Various embodiments of the present invention relate to a method of coating a surface of an interior component for a vehicle. FIG. 1 is an exemplified view illustrating a state in which a component made of a real material 11 and coated with polyurethane in the related art is applied. In a case in which the real material 11 such as wood is applied to an interior component for a vehicle as illustrated in FIG. 1, a method of coating a surface of the interior component for a vehicle, to which the real material 11 is applied, with polyurethane is applied in order to protect an external appearance of the wooden material and to implement a depth property of the external appearance.

Figure 2:
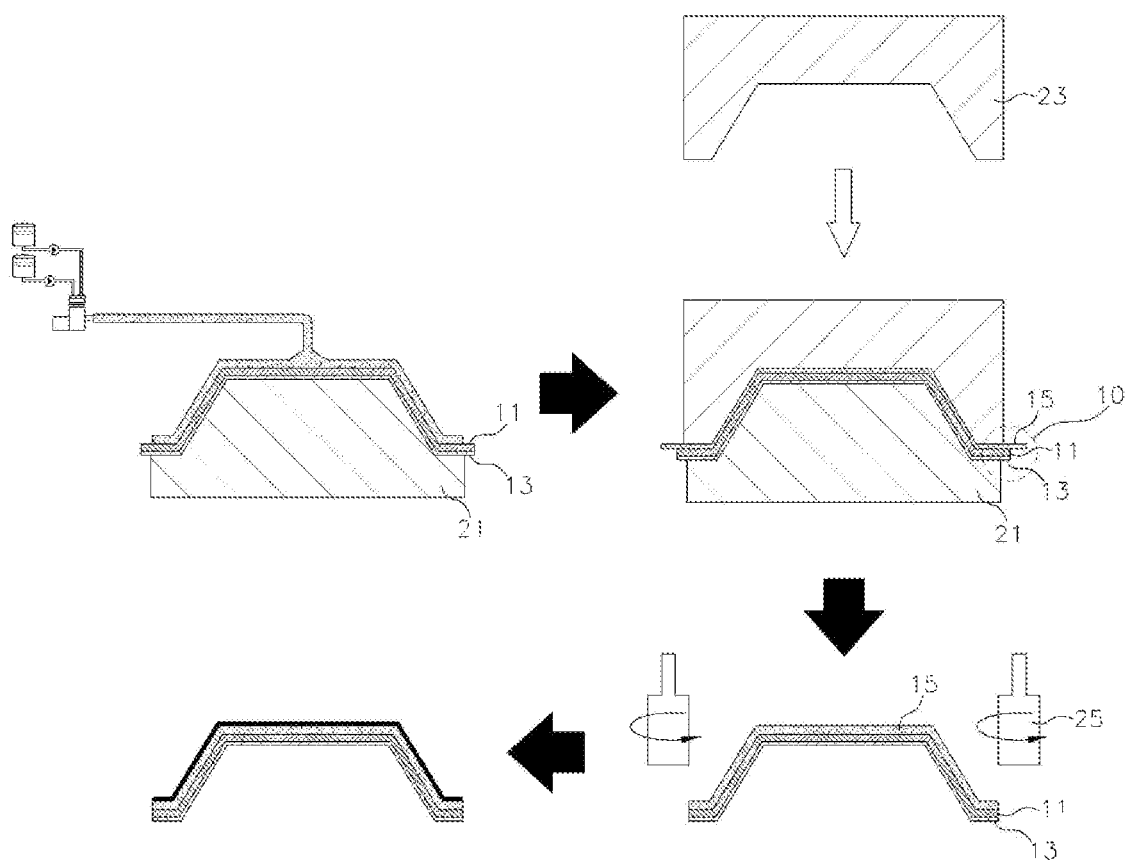
FIG. 2 is a stepwise configuration diagram illustrating a method of coating an interior component for a vehicle, which is made of a real material, with polyurethane in the related art.

FIG. 2 is a stepwise configuration diagram illustrating a method of coating an interior component for a vehicle, which is made of the real material 11, with polyurethane in the related art. In the related art, a lower mold 21 and an upper mold 23 are coupled to each other in an open manner without being closed in order to coat the surface of the real material 11 with polyurethane. More specifically, the real material 11 is seated on the lower mold 21, and then polyurethane is applied onto the surface of the real material 11 at a pressure of about 50 bar. Therefore, the real material is pressed by the upper mold 23, thereby forming a polyurethane coating layer 15 with a thickness of about 0.8 mm. In this case, an overmolded portion 10 formed at an outer peripheral portion of the product is removed by using a milling roll 25. Finally, sanding and polishing are performed on the polyurethane coating layer 15 so that a surface of the polyurethane coating layer 15 is glossy, and the outer peripheral portion of the product is finished by painting. The related art has an advantage in that a depth property of the surface of the interior component for a vehicle is excellent, but the coating method in the related art has problems in that manufacturing cost is high, processes are complicated because four steps are required, and a large amount of manufacturing time is required because it takes typically two days to manufacture the component. Moreover, there is a problem in that an inferiority rate reaches 15%.

Various embodiments of the present invention have been made in an effort to solve the problems in the related art, and a method of injecting polyurethane is changed from an open type to a closed type. Various embodiments of the present invention includes a coupling step of coupling a mold cavity 115 on an interior component for a vehicle which is seated on a core 111 and closing the mold cavity 115, and a coating step of coating a surface of the interior component by injecting polyurethane into an interior of the coupled mold cavity 115 and the core 111. The overmolded portion 10, which is a problem in the related art, is not formed by the mold cavity 115 and the core 111 which are closed. Moreover, the coupling step includes a seating step of seating a real material 101 on an upper mold 113; a closing step of coupling the core on the upper mold 113 and closing the core; a back injection molding step of injecting a base material, by back injection molding, to a surface of the material 101 positioned in the interior closed by the core 111 and the upper mold 113; and a mold removing step of removing the upper mold 113. Furthermore, the coating step includes injecting polyurethane at a pressure of 150 to 200 bar, and the polyurethane coating layer 105 has a thickness of 0.8 to 1.2 mm.

Figure 3:
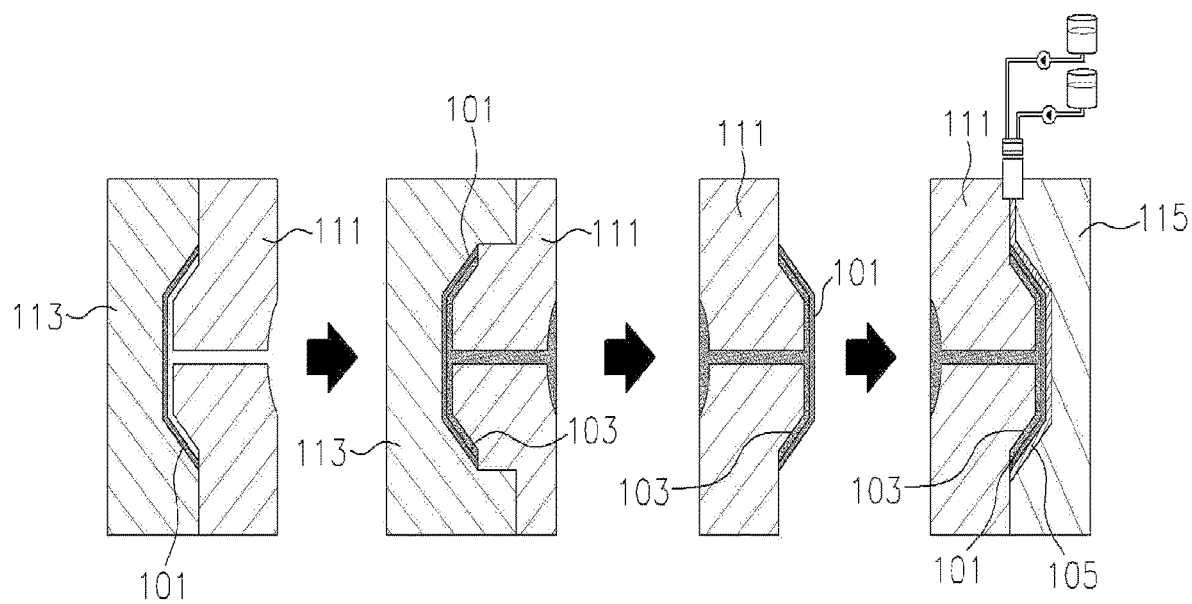
FIG. 3 is a stepwise configuration diagram illustrating a method of coating an interior component for a vehicle, which is made of a real material, with polyurethane according to various embodiments of the present invention.

The method of coating the interior component for a vehicle according to the present invention will be more specifically described. FIG. 3 is a stepwise configuration diagram illustrating the method of coating the interior component for a vehicle, which is made of the real material 101, with polyurethane according to various embodiments of the present invention. First, the real material 101 is seated on the upper mold 113, and then the upper mold 113 and the core 111 are coupled and closed. Thereafter, a base material is coupled to a rear surface of the real material 101 by injecting a base material, by back injection molding, to a surface of the material positioned in the interior closed by the core 111 and the upper mold 113. Thereafter, the upper mold 113 is removed, and then the mold cavity 115 and the core are coupled and closed. Next, the surface of the interior component for a vehicle is coated by injecting polyurethane into the interior closed by the mold cavity 115 and the core 111. The pressure at which the polyurethane is injected may be 150 to 200 bar, and a thickness of the polyurethane coating layer 105 formed by the coating method may be 0.8 to 1.2 mm.

In the related art, since polyurethane is injected into an open type mold, the overmolded portion 10 is formed, and as a result, it is necessary to additionally perform a process of removing the overmolded portion 10 and a surface treatment process. However, in various embodiments of the present invention, since polyurethane is injected into the interior closed by the mold cavity 115 and the core 111, the overmolded portion 10 is not formed, and as a result, the removing process and the surface treatment process may be omitted. However, in the present invention, in a case in which polyurethane is injected into the interior closed by the mold cavity 115 and the core 111, there may be a problem with sealing of a product parting line formed between the mold cavity 115 and the core 111 because of the nature of a liquid phase polyurethane material having good fluidity.

Figure 4:
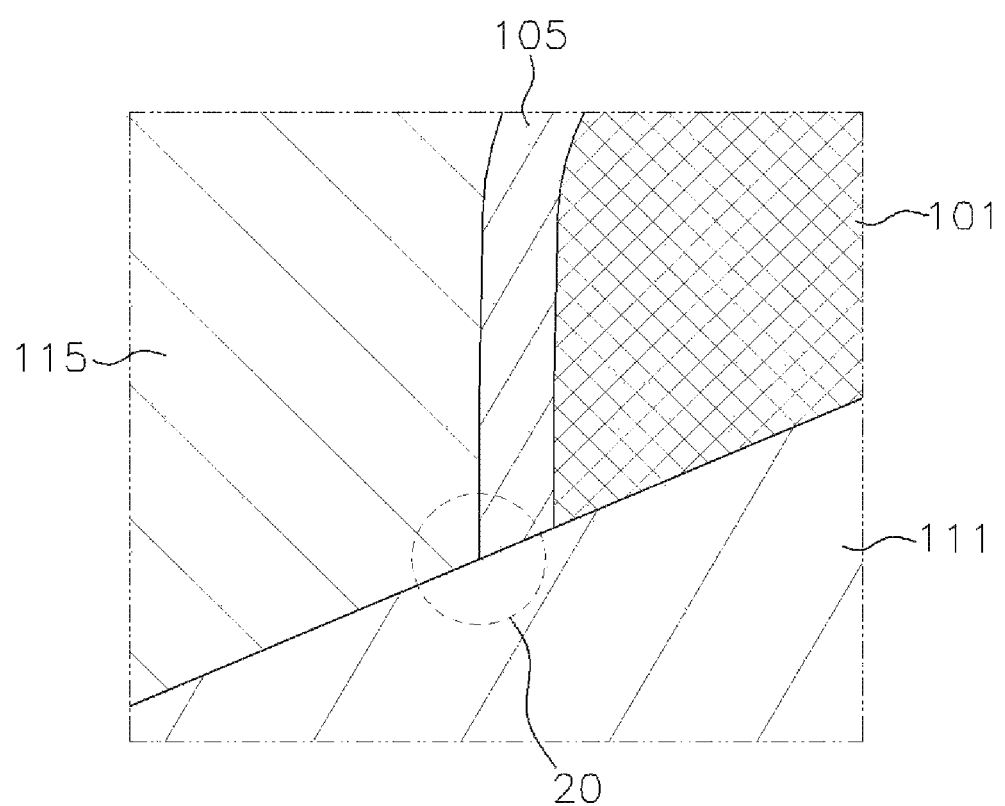
FIG. 4 is a partially enlarged view of a portion where a polyurethane burr is formed in the coating method according to various embodiments of the present invention.
Figure 5:
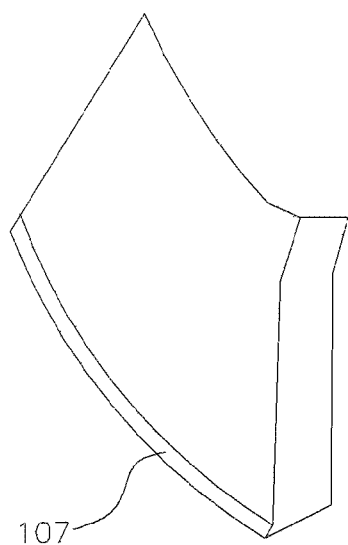
FIG. 5 is a partially enlarged view of a portion where a polyurethane burr is formed when coating is performed in accordance with the coating method according to various embodiments of the present invention.

The aforementioned problem will be specifically described. FIG. 4 is a partially enlarged view of a portion 20 where a polyurethane burr is formed in the coating method according to various embodiments of the present invention, and FIG. 5 is a partially enlarged view of a portion where a polyurethane burr 107 is formed when coating is performed in accordance with the coating method according to various embodiments of the present invention. Since the method of injecting polyurethane is changed from a method of injecting polyurethane into an open interior in the related art to a method of injecting polyurethane into the closed interior in the present invention, the polyurethane burr 107 is formed at parting lines between the interior component for a vehicle, the mold cavity 115, and the core 111 as illustrated in FIG. 5, and as a result, there is a problem in that a process of removing the polyurethane burr is additionally required.

In various embodiments of the present invention, in order to solve the problem, a portion of an inner surface of the mold cavity 115 includes a protrusion 120 extending from the inner surface of the mold cavity 115 so that a first overlap portion is recessed at one side of the interior component for a vehicle which overlaps the protrusion 120 of the mold cavity 113. In addition, the first overlap portion the first overlap portion is formed by a first section which is recessed in a direction toward the real material at a height identical to a height of the polyurethane coating layer, and in which the mold cavity and t he real material overlap each other by 0.15 to 0.3 mm, a second section which is extended from the first section and bent in a direction toward the mold cavity and in which the mold cavity and the real material overlap each other by 0.15 to 0.3 mm, and a third section which is extended from the second section and bent in a direction toward the core and in which the mold cavity and the real material overlap each other by 2.0 to 2.5 mm. Moreover, a space portion 109 spaced at a predetermined interval and a protruding second overlap portion are formed at the other side of the interior component for a vehicle which overlaps the mold cavity 113. Furthermore, the second overlap portion is formed by a fourth section which is extended from the core and recessed in a direction toward the mold cavity and overlaps by 0.15 to 0.3 mm, a fifth section which is extended from the fourth section and bent vertically and overlaps 3 to 5 mm, and a sixth section which is extended from the fifth section and bent and extended in parallel with a surface of the mold cavity.

Figure 6:
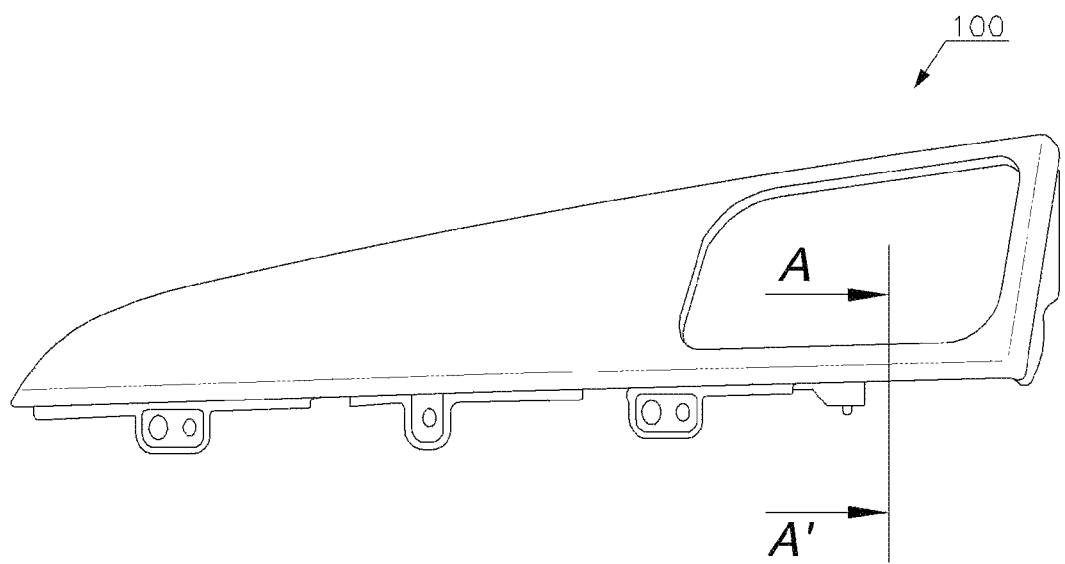
FIG. 6 is a configuration diagram of the interior component for a vehicle according to various embodiments of the present invention.
Figure 7:
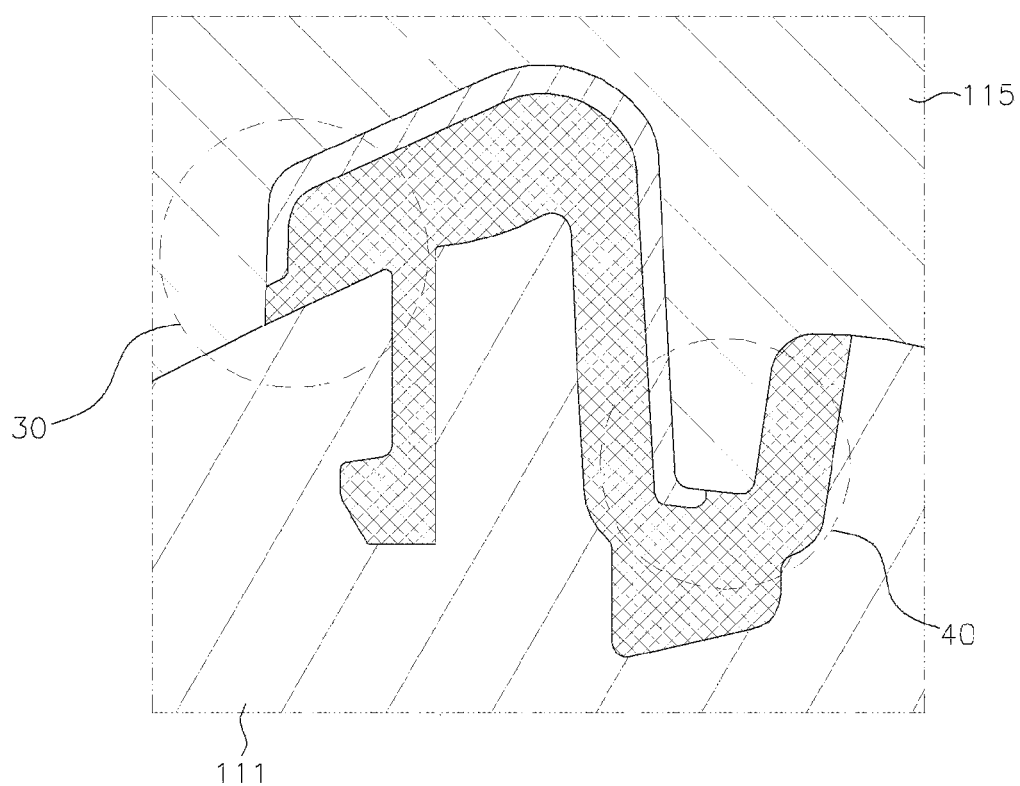
FIG. 7 is a cross-sectional view illustrating a cross section of the interior component for a vehicle according to various embodiments of the present invention.

More specifically, FIG. 6 is a configuration diagram of an interior component 100 for a vehicle according to various embodiments of the present invention. FIG. 7 illustrates a cross section taken along line A-A' in FIG. 6. FIG. 7 is a cross-sectional view illustrating a cross section of the interior component 100 for a vehicle according to various embodiments of the present invention. As illustrated in FIG. 7, the present invention includes a cross-sectional structure for preventing polyurethane leakage. As illustrated in FIG. 7, in a case in which the surface of the interior component 100 for a vehicle is coated with polyurethane in a closed type, it is possible to prevent formation of the polyurethane burr 107 by adding a sealing portion in accordance with a shape of the interior component for a vehicle such as the cross section A-A'.

Figure 8:
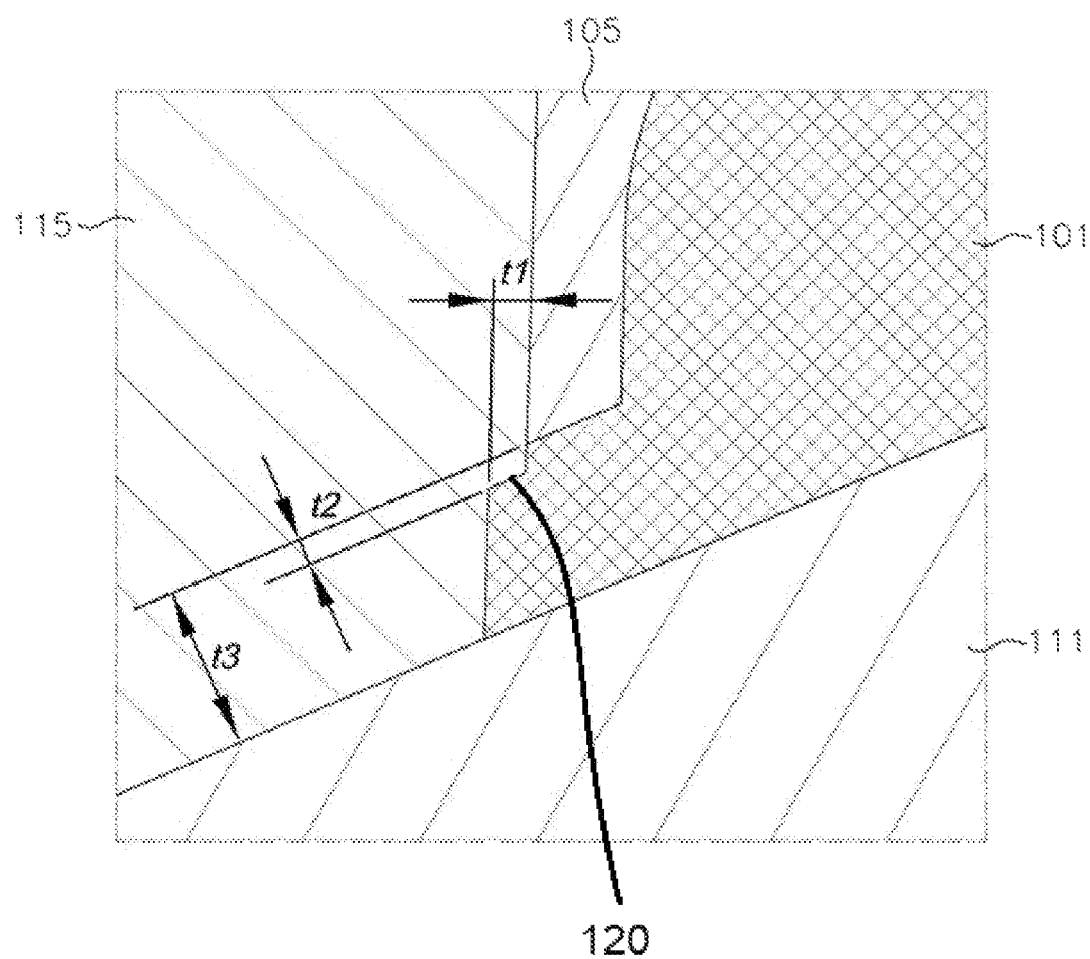
FIG. 8 is a partially enlarged view illustrating a lateral sealing portion in the cross section of the interior component for a vehicle according to various embodiments of the present invention.
Figure 9:
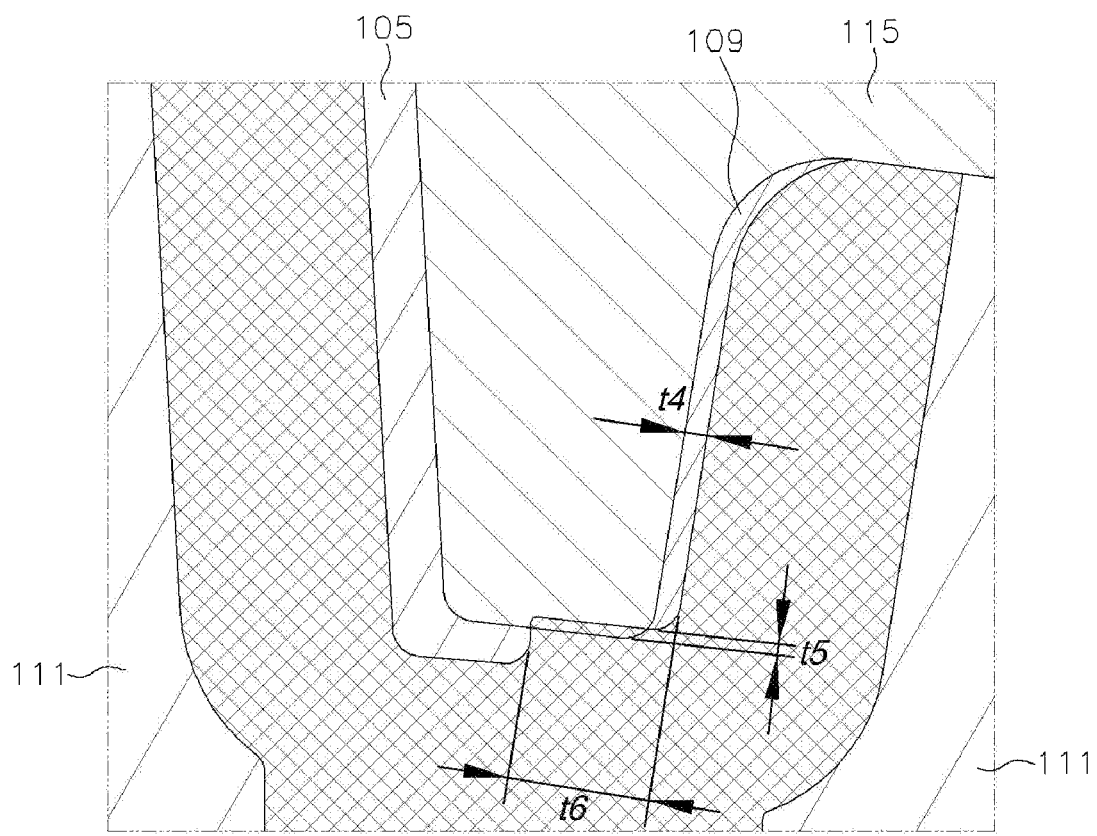
FIG. 9 is a partially enlarged view illustrating a bottom sealing portion in the cross section of the interior component for a vehicle according to various embodiments of the present invention.

The sealing portion, that is, a lateral sealing portion 30 and a bottom sealing portion 40 will be specifically described. FIG. 8 is a partially enlarged view of the lateral sealing portion 30 in the cross section of the interior component 100 for a vehicle according to various embodiments of the present invention. As illustrated in FIG. 8, an overlap section with intervals t1 and t2 is formed between the mold cavity 115 and the real material 101 so as to primarily block leakage, and a section with a height t3 is formed to secondarily block leakage. Moreover, the interval t1 in the lateral sealing portion 30 may be 0.15 to 0.3 mm, the interval t2 may be 0.15 to 0.3 mm, and the thickness t3 may be 2.0 to 2.5 mm. FIG. 9 is a partially enlarged view of the bottom sealing portion 40 in the cross section of the interior component 100 for a vehicle according to various embodiments of the present invention. As illustrated in FIG. 9, an overlap section with an interval t5 is formed between the mold cavity 115 and the real material 101 so as to primarily block leakage, and an overlap section with a thickness t6 is formed between the mold cavity 115 and the real material 101 so as to secondarily block leakage. In addition, a space as much as the section t4 is formed between a base material 103 and the mold cavity 115, thereby forming a structure for preventing deformation of the overlap section caused by deformation of the interior component 100 for a vehicle. Furthermore, the interval t4 in the bottom sealing portion may be 0.5 to 0.8 mm, the interval t5 may be 0.15 to 0.3 mm, and the interval t6 may be 3 to 5 mm.

The polyurethane may be black-colored polyurethane, and the base material may have a base material surface to which a pattern is added. More specifically, the polyurethane coating layer 105 on the surface of the real material 101 may improve a depth property of the real material 101 and protect the surface of the real material 101. In addition, the pattern is added to the base material, and as a result, a depth property and a 3D quality of the pattern are implemented. Moreover, by injecting black-colored polyurethane instead of polyurethane, high black glossy appearance may be implemented, and as a result, the black-colored polyurethane may be substituted for painting.

Various embodiments of the present invention relate to the interior components for a vehicle which are coated by the method of coating the surface of the interior component for a vehicle. According to the interior component for a vehicle, a depth property of the surface of the interior component for a vehicle may be improved and the surface of the interior component may be protected by the polyurethane coating layer.

Various embodiments of the present invention provide the coating method that performs coating by injecting polyurethane into the interior closed by the mold cavity and the core, and as a result, it is possible to improve a depth property of the surface of the interior component for a vehicle, protect surfaces of the interior components, reduce manufacturing costs by reducing the number of manufacturing steps, and enable mass production by simplifying a manufacturing method.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of coating a surface of a real material for a vehicle, the method comprising:
    coupling a mold cavity on the real material seated on a core and closing the mold cavity; and
    coating a surface of the real material by injecting polyurethane into an interior of the coupled mold cavity and the core,
    wherein a portion of an inner surface of the mold cavity includes a protrusion extending from the inner surface of the mold cavity so that a first overlap portion is formed to be recessed by the protrusion at a first side of the real material which overlaps the mold cavity,
    wherein the first overlap portion comprising:
        a first section which is recessed in a direction toward the real material in a longitudinal direction of the core at a height identical to a height of a coating layer of the polyurethane:
        a second section which is extended from the first section and bent in a direction toward the mold cavity; and
        a third section which is extended from the second section and bent in a direction toward the core, and
    wherein in the first section, the second section and the third section, the mold cavity and the real material overlap each other.

2. The method of claim 1, wherein the method further including: before the coupling the mold cavity on the real material seated on the core and closing the mold cavity,
    seating the real material on an upper mold;
    coupling the core on the upper mold and closing the core;
    injecting a base material, by back injection molding, to a surface of the real material positioned in the interior closed by the core and the upper mold; and
    removing the upper mold.

3. The method of claim 1, wherein in the first section, the mold cavity and the real material overlap each other by 0.15 to 0.3 mm and wherein in the second section, the mold cavity and the real material overlap each other by 0.15 to 0.3 mm and wherein the mold cavity and the real material overlap each other by 2.0 to 2.5 mm.

4. The method of claim 1, wherein a space portion spaced at a predetermined interval and a protruding second overlap portion are formed at a second side of the real material which overlaps the mold cavity.

5. The method of claim 4, wherein the second overlap portion is formed by a fourth section which is extended from the core and recessed in a direction toward the mold cavity and overlaps by 0.15 to 0.3 mm, a fifth section Which is extended from the fourth section and bent vertically and overlaps 3 to 5 mm, and a sixth section which is extended from the fifth. section and bent and extended parallel to a surface of the mold cavity.

6. The method of claim 1, wherein the coating of the surface of the real material includes injecting the polyurethane at a pressure of 150 to 200 bar.

7. The method of claim 1, wherein a thickness of a coating layer of the polyurethane is 0.8 to 1.2 mm.

8. The method of claim 1, wherein the polyurethane comprises black-colored polyurethane.

9. The method of claim 2, wherein the base material has a base material surface to which a pattern is added.

10. The method of claim 1, wherein an end of the third section is positioned to contact with the core.

11. The method of claim 1, wherein the first section and the second section of the first overlap portion overlap the protrusion of the mold cavity and the third section of the first overlap portion overlaps the mold cavity.

* * * * *